US012627357B2

(12) United States Patent
Fryking et al.

(10) Patent No.: US 12,627,357 B2
(45) Date of Patent: May 12, 2026

(54) ADAPTIVE BEAM FILTER FOR MOBILE COMMUNICATION SYSTEMS

(71) Applicant: Telefonaktiebolaget LM Ericsson (publ), Stockholm (SE)

(72) Inventors: Per Fryking, Lund (SE); Bhavin Patel, Malmö (SE); Jianmin Hou, Lund (SE); Anders Berkeman, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 388 days.

(21) Appl. No.: 18/273,936

(22) PCT Filed: Mar. 2, 2021

(86) PCT No.: PCT/EP2021/055122
§ 371 (c)(1),
(2) Date: Jul. 24, 2023

(87) PCT Pub. No.: WO2022/184233
PCT Pub. Date: Sep. 9, 2022

(65) Prior Publication Data
US 2024/0421887 A1      Dec. 19, 2024

(51) Int. Cl.
*H04B 7/00* (2006.01)
*H04B 7/0408* (2017.01)
*H04B 7/06* (2006.01)

(52) U.S. Cl.
CPC ....... *H04B 7/06952* (2023.05); *H04B 7/0408* (2013.01); *H04B 7/06966* (2023.05)

(58) Field of Classification Search
CPC .............. H04B 7/06952; H04B 7/0408; H04B 7/06966; H04B 7/088; G06N 7/01
See application file for complete search history.

(56) References Cited

U.S. PATENT DOCUMENTS

| | | | | |
|---|---|---|---|---|
| 11,271,699 | B1 * | 3/2022 | Eyuboglu | ............ H04J 11/0073 |
| 2006/0093055 | A1 | 5/2006 | Goldberg | |
| 2018/0139784 | A1 * | 5/2018 | Ryoo | .................. H04W 72/046 |
| 2019/0007122 | A1 * | 1/2019 | Furuskog | ............ H04B 7/0695 |
| 2019/0320364 | A1 * | 10/2019 | Jeon | ......................... H04W 8/08 |
| 2022/0393748 | A1 * | 12/2022 | Hill | ......................... H04B 7/022 |
| 2023/0370233 | A1 * | 11/2023 | Zhang | .................. H04B 7/0408 |
| 2024/0421887 | A1 * | 12/2024 | Fryking | ............. H04B 7/0695 |

FOREIGN PATENT DOCUMENTS

| | | |
|---|---|---|
| WO | 2007105999 A1 | 9/2007 |
| WO | 2019118676 A1 | 6/2019 |
| WO | 2020227859 A1 | 11/2020 |

* cited by examiner

*Primary Examiner* — Md K Talukder
(74) *Attorney, Agent, or Firm* — COATS & BENNETT, PLLC

(57) ABSTRACT

A computer-implemented method (400), performed by a network node (120), for determining a candidate beam for a beam transition by a wireless communications device (100) in a beam grid, comprises: monitoring (302) beam tracking data from a plurality of wireless communications devices (110) at a plurality of locations in the beam grid over a period of time; generating (316) a beam grid history comprising monitored beam tracking data; and determining (418), based on at least the beam grid history and current beam measurement data received from a wireless communications device (110) at a location in the beam grid, at least one candidate beam for a beam transition by the wireless communications device (110).

22 Claims, 9 Drawing Sheets

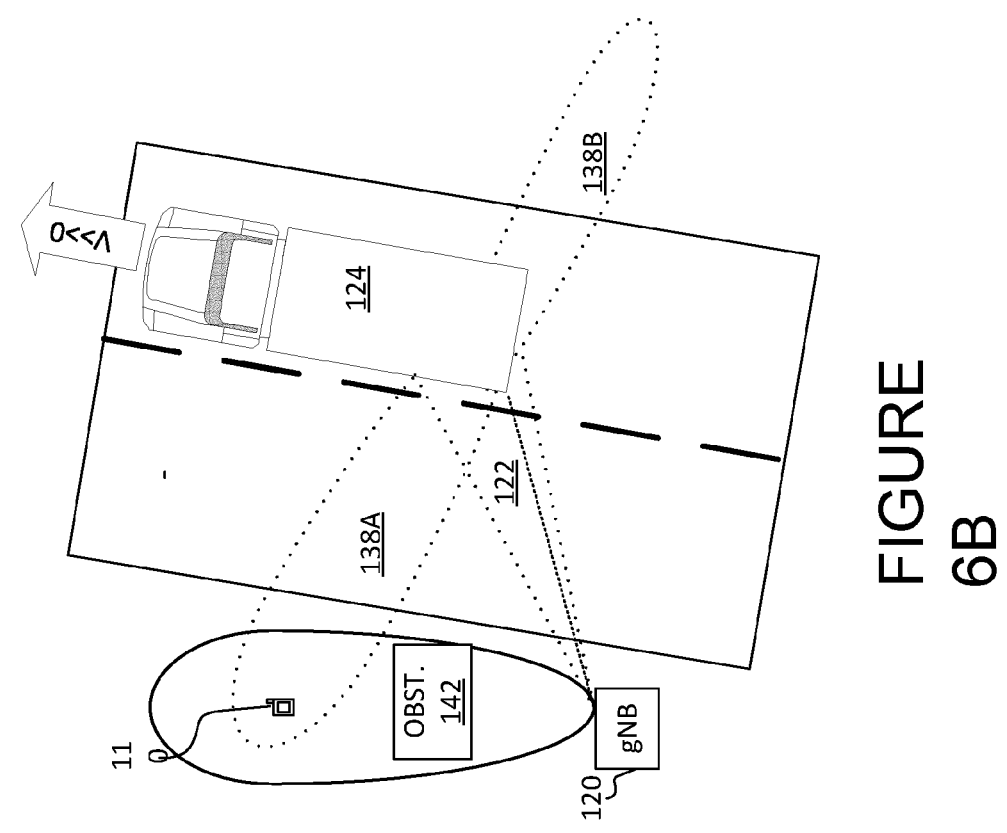
FIGURE
6B
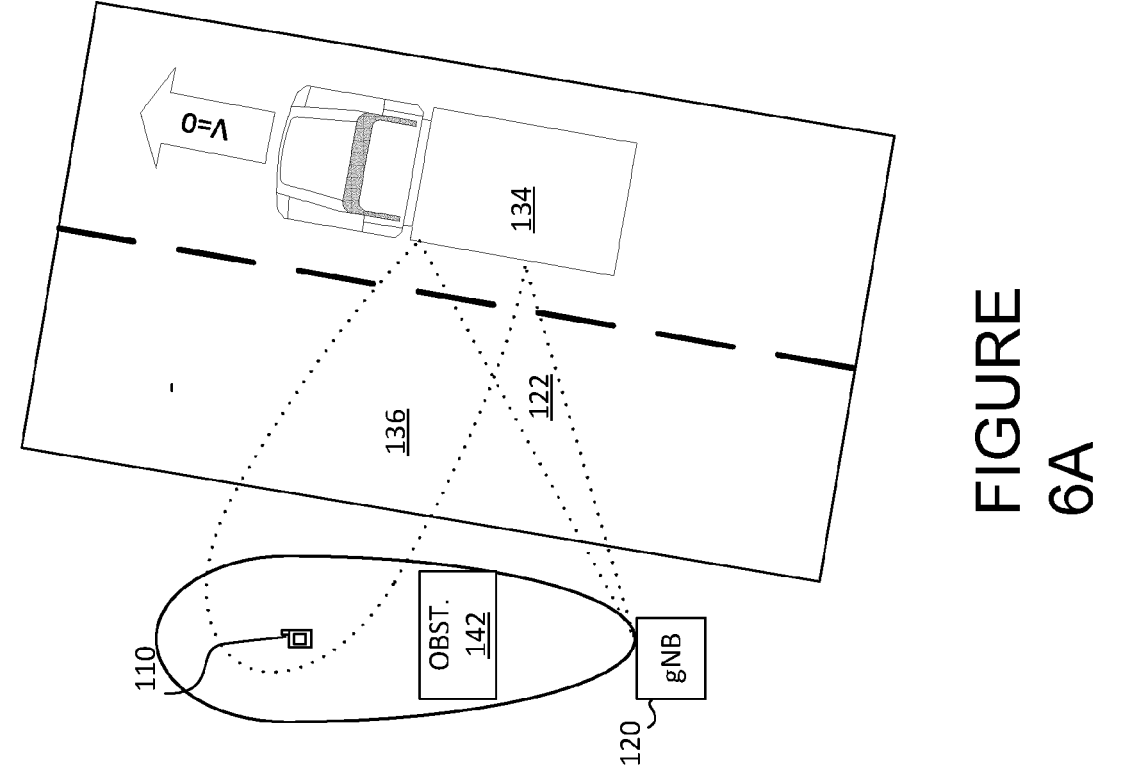
FIGURE
6A

ADAPTIVE BEAM FILTER FOR MOBILE COMMUNICATION SYSTEMS

TECHNICAL FIELD

The present disclosure relates to determining the availability of temporally dynamic beams for beam transitions in mobile communication systems. In particular, but not exclusively to a beam filter for a communication system and to various related aspects.

BACKGROUND

In a new radio, NR, radio access network, RAN, such as 5G, fifth generation, and 6G, sixth generation, networks, very high user throughput (>1 Gbps) under the 3GPP's NR enhanced mobile broadband, eMBB, use case is expected. Millimeter wavelength bandwidth analog beamforming, ABF, is used in 5G NR RAN to address the high user throughput issues. In an urban environment obstacles can block line of sight, LoS, from a mobile communications device or user equipment, UE, to the NR RAN nodes from which the beams are being emitted and so reflective beams are used to supplement direct beam coverage.

At present, NR RAN nodes such as next-generation network nodes or gNBs do not categorize reflections into either static or temporally dynamic, as in temporary or moving, reflections. Switching a UE to a temporally dynamic beam reflection is risky as the reflection may not be sufficiently stable for the entire duration a UE may need to use it to communicate with the gNB, and there is a risk that there will not be time to transition to another beam if the temporary beam disappears. As measurement typically is done in the spatial vicinity of the currently serving beam, a viable alternative might not exist once the reflection disappears. In that case, gNB uses on wide beam tracking, which is a much slower process, and if the beam reflection disappears too quickly, then the UE could lost its connection to gNB. This causes a bad user experience both in terms of connectivity and power consumption of UE, as the UE will spend a large amount of resources trying to find a suitable beam to transition too.

Temporally dynamic beams may also appear in a communications network beam grid from mobile network nodes such as gNBs mounted on drones in a 5G NR RAN. Such mobile network nodes may provide temporary network coverage for mass participant events such as festivals. The beams of the mobile gNB will appear unexpectedly in the beam grid. Until and unless such temporary beams are recognized as being available for beam transitions, however, their effectiveness in providing additional network capacity is limited.

There is a need accordingly for improved beam management in communications systems where temporally dynamic beams and temporally dynamic beam reflections are used.

SUMMARY

The disclosed technology seeks to mitigate, obviate, alleviate, or eliminate one or more of the above example problems with current technology and/or to improve a communication over a radio access network. Various aspects of the disclosed technology are as set out in this summary section with examples of some embodiments, which may be preferred embodiments. Additional aspects and preferred embodiments are also set out in the claims.

An object of the disclosed technology seeks to provide improved beam management in a communications system, for example, in a communications system where temporally dynamic beams and beam reflections can unexpectedly appear in the beam grid of the communications system.

A first aspect of the disclosed technology relates to a computer-implemented method, performed by a network node, for determining a candidate beam for a beam transition by a wireless communications device in a beam grid, the method comprising: monitoring beam tracking data from a plurality of wireless communications devices at a plurality of locations in the beam grid over a period of time; generating a beam grid history comprising monitored beam tracking data; and determining at a location in the beam grid, at least one candidate beam for a beam transition by the wireless communications device.

The method of the first aspect may result in fewer occasions or no occasions where a wireless communications device is switched to a temporally dynamic beam reflection which is not suitable for it to use. Beam reflections which could fade and so provide a poor radio channel and/or even eventually lead to radio link failure with a network node may be avoided by using a beam grid history comprising monitored beam measurement information to identify beam reflections which have been successfully used in the past in a particular region of the beam grid.

A second aspect of the disclosed technology relates to a method performed by a wireless communications device navigating a beam grid in a communications network, the method comprising: sending detected beam data to a network node configured to use the beam data to select a beam candidate using a method according to the first aspect or any of its disclosed embodiments, receiving an indication of a candidate beam selection from the network node, and transferring to the candidate beam.

A third aspect of the disclosed technology relates to a wireless communications device comprising a processor or controller or processing or control circuitry configured to perform a method according to the second aspect or any of its disclosed embodiments, for example, to a wireless communications device or control circuitry comprising means or one or more modules configured to send detected beam data to a network node configured to use the beam data to select a beam candidate using a method according to the first aspect or any of its disclosed embodiments, means or one or more modules configured to receive an indication of a candidate beam selection from the network node, and means or one or more modules configure to transfer to the candidate beam.

The processor or control circuitry may be configured to execute computer code configured as one or more modules which, when loaded from memory and executed by the processor or control circuitry causes the wireless communications device to perform a method according to the second aspect or any of its embodiments as disclosed, for example, by sending detected beam data to a network node configured to use the beam data to select a beam candidate using a method according to the first aspect or any of its disclosed embodiments, by receiving an indication of a candidate beam selection from the network node, and by transferring to the candidate beam.

A fourth aspect of the disclosed technology relates to a computer readable storage medium comprising computer code, which when loaded and executed by one or more processors or processing circuitry of a wireless communications device causes the wireless communications device to perform a method according to the second aspect or any of its disclosed embodiments, for example, which causes the wireless communications device to send detected beam data to a network node configured to use the beam data to select a beam candidate using a method according to the first aspect or any of its disclosed embodiments, and to receive an indication of a candidate beam selection from the network node, and transferring to the candidate beam.

A fifth aspect of the disclosed technology relates to a computer readable storage medium comprising computer code, which when loaded and executed by one or more processors or processing circuitry of a network node causes the network node to perform a method according to any of the first aspect or any of its disclosed embodiments, for example, which causes the network node to perform a computer-implemented method for determining a candidate beam for a beam transition by a wireless communications device in a beam grid, the method comprising: monitoring beam tracking data from a plurality of wireless communications devices at a plurality of locations in the beam grid over a period of time; generating a beam grid history comprising monitored beam tracking data; and determining at a location in the beam grid, at least one candidate beam for a beam transition by the wireless communications device.

A sixth aspect of the disclosed technology relates to a network node comprising a processor or controller or processing or control circuitry configured to perform a method according to the first aspect or any of its disclosed embodiments. The processor or control circuitry may be configured to execute computer code configured as one or more modules which, when loaded from memory and executed by the processor or control circuitry cases the network node to perform a method according to the first aspect or any of its disclosed embodiments, for example, to perform a computer-implemented method for determining a candidate beam for a beam transition by a wireless communications device in a beam grid, the method comprising: monitoring beam tracking data from a plurality of wireless communications devices at a plurality of locations in the beam grid over a period of time; generating a beam grid history comprising monitored beam tracking data; and determining at a location in the beam grid, at least one candidate beam for a beam transition by the wireless communications device.

A seventh aspect of the disclosed technology relates to network node or control circuitry comprising means or one or more modules for performing the method of the first aspect or any of its disclosed embodiments, for example, to a network node configured to determine a candidate beam for a beam transition by a wireless communications device in a beam grid, wherein the network node comprises: means or one or more modules for monitoring beam tracking data from a plurality of wireless communications devices at a plurality of locations in the beam grid over a period of time; means or one or more modules for generating a beam grid history comprising monitored beam tracking data; and means or one or more modules for determining at a location in the beam grid, at least one candidate beam for a beam transition by the wireless communications device.

The disclosed aspects and embodiments set out above and in the claims may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which:

FIG. 6A illustrates schematically an example of a semi-static beam reflection;

FIG. 6B illustrates schematically an example of a temporally dynamic beam reflection;

DETAILED DESCRIPTION

Figures 1A, 1B:
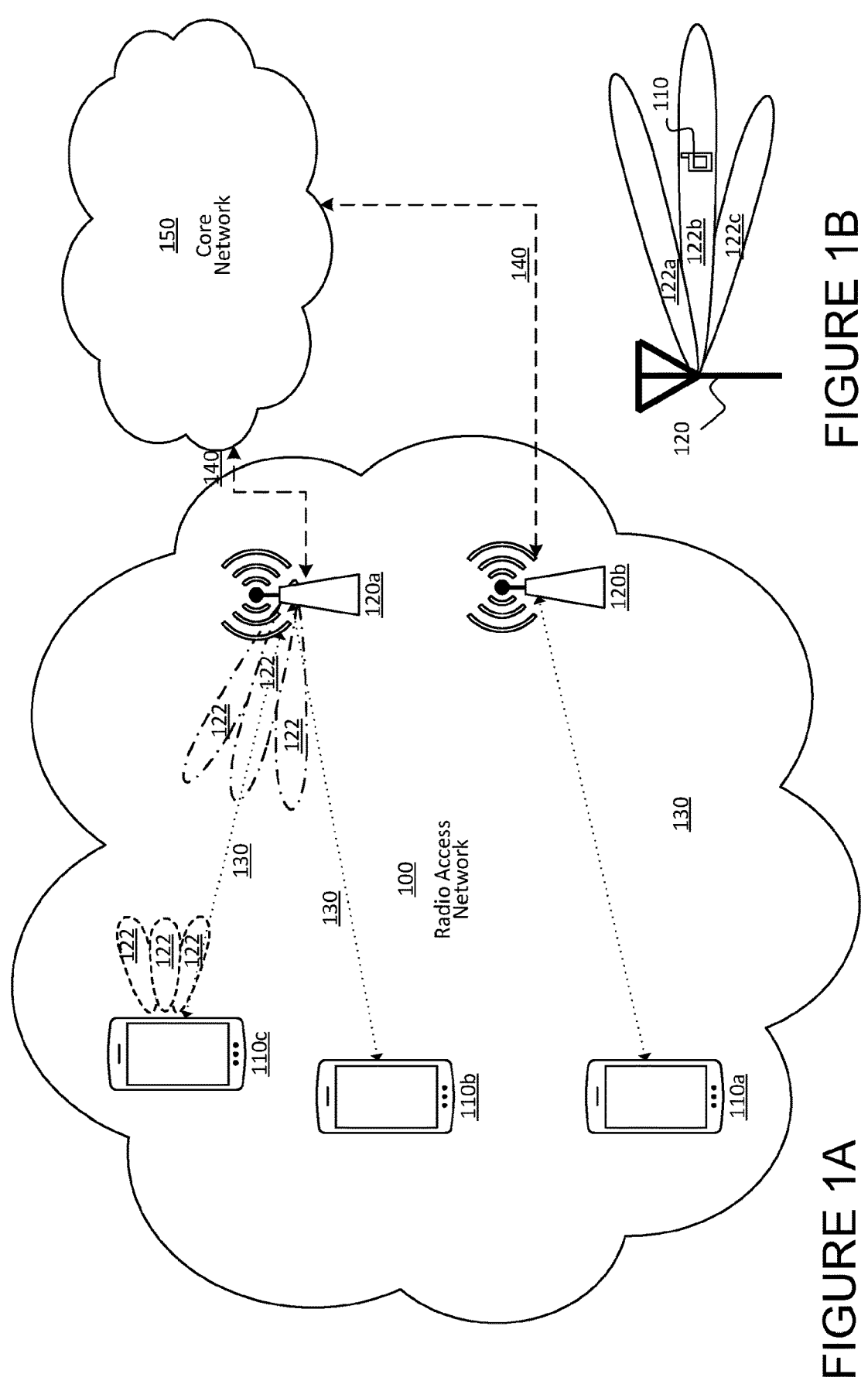
FIG. 1A schematically illustrates a radio access network.
FIG. 1B schematically illustrates an example of network node providing beams to a wireless communications device according to some embodiments of the disclosed technology.

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

FIG. 1A schematically illustrates a radio access network which comprises a plurality of wireless communications devices 110, illustrated schematically as wireless communications device 110A, 110B, and 110C, and a plurality of network nodes 120, illustrated schematically as network nodes 120A, 120B. As shown in FIG. 1A, each network node 120 is configured to connect to a core network 150 over a communication links 140 and with the wireless communication devices 110A, 110B, and 110C via wireless communications links 130 in the form of mm wavelength beams. In some embodiments, NR RAN 100 comprises a 5G network and each network node 120 comprises a gNB or similar type of network node with base station functionality. For the sake of clarity, in FIG. 1A, mm beams communication links are shown only being emitted by network node 120A and mm beam communication links are shown only being received by a wireless communications device 110C.

Figure 5:
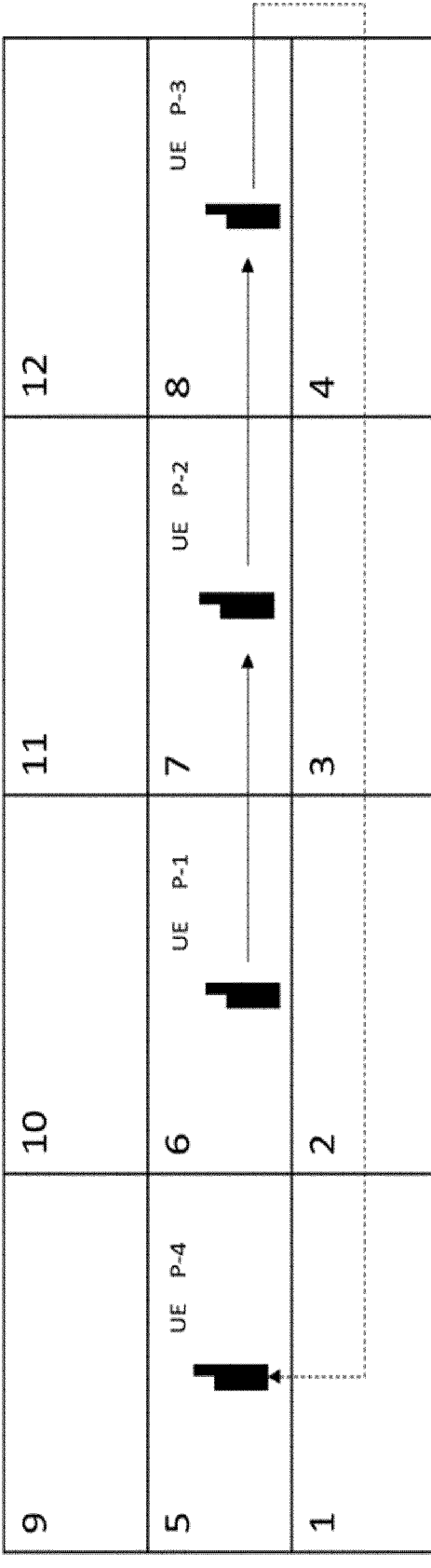
FIG. 5 illustrates schematically an example movement path of a wireless communication device in a beam grid according to some embodiments of the disclosed technology.

FIG. 1B schematically illustrates in more detail how network node 120A provides wide-beam communications coverage for use by wireless communications device 110C. As shown in FIG. 1B, three beams 122A, 122B, 122C are illustrated. Although depicted laterally in the Figure, each of the three beams 122A, 122B, 122C provide communications coverage in a particular cell or region of a beam grid. The wireless communications device 110C is shown residing within the region where coverage is provided by beam 122B. A beam grid of a NR RAN 100 comprises a plurality of communication beams 122. A wireless communications device 110 moves within the beam grid of the NR RAN 100 by transferring from beam to beam. FIG. 5 shows an example of a beam grid.

Figures 2A, 2B, 2C:
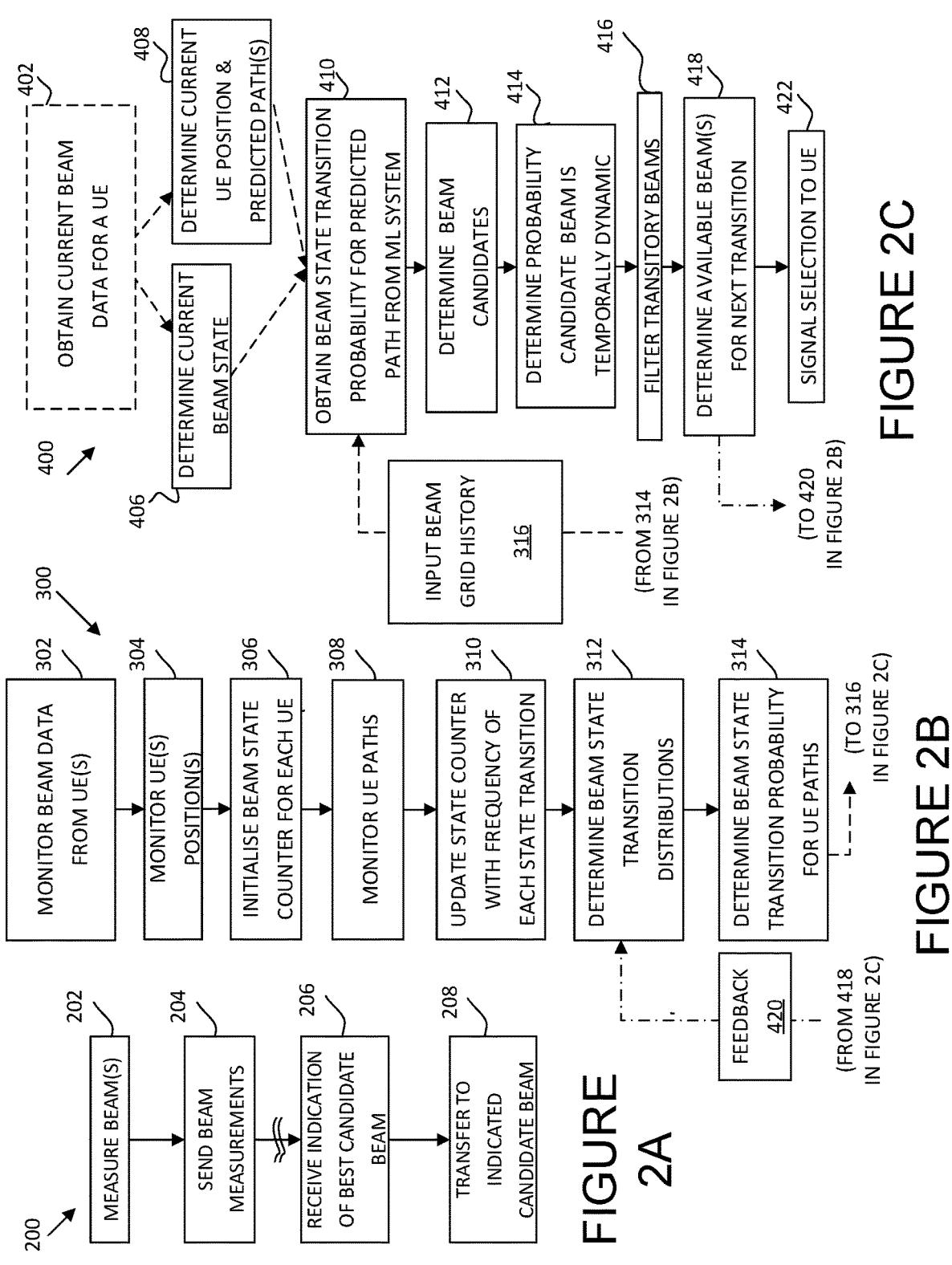
FIG. 2A schematically illustrates a method for performed by a wireless communications device according to some embodiments of the disclosed technology.
FIG. 2B schematically illustrates a method of generating a beam grid history according to some embodiments of the disclosed technology.
FIG. 2C schematically a method of determining the availability of a beam for a beam transition a beam grid according to some embodiments of the disclosed technology.

FIG. 2A schematically illustrates an embodiment of method 200 which is performed by a wireless communications device 110 according to the second aspect of the disclosed technology. In some embodiments, method 200 is performed by the wireless communications device 110 whilst navigating a beam grid in a communications network. In some embodiments, the method 200 comprises: sending 204 detected beam data to a network node configured to use the beam data to select a beam candidate, for example, by using a method of the first aspect or any of its disclosed embodiments, for example, by a network node which performs the methods shown in FIGS. 2B and 2C. The wireless communications device 110 receives 206 an indication of a candidate beam selection from the network node 120, for example, the wireless communications device 110 may receive the selection signalled or otherwise indicated as 422 in FIG. 2C. The wireless communications device 110 then transfers 208 to the indicated candidate beam.

In some embodiments, the method 200 comprises sending 204 beam data for at least one detected beam to a network node 120, receiving 206 an indication of a beam to transfer to for subsequent communications with the network node; and transferring 208 to the indicated beam, wherein the indicated beam is a candidate beam selected by the network node using the method 400 or any other disclosed embodiment of the method according to the first aspect where a candidate beam is selected based on at least the sent 204 beam data and the beam grid history generated by method 300.

The wireless communications device 110 may comprise apparatus having the configuration shown schematically in FIG. 7 described later below in some embodiments, for example, it may comprise a processor or controller or processing or control circuitry configured to perform an embodiment of method 200. Wireless communications device 110 comprises user equipment in some embodiments and references to a wireless communications device 110 should also be considered to be a reference to a user equipment unless to context dictates otherwise. The term "user equipment" is not to be considered to equipment only operated by a human, but may include equipment capable of being remotely operated via a robotic or equipment which may be autonomously operated or an autonomous wireless communications device 110. Further examples of wireless communications device 110 and user equipment are provided later below.

In some embodiments of the method 200 illustrated schematically in FIG. 2A, the method comprises the wireless communications device 110 first measuring 202 one or more characteristics of at least one beam at a location in a beam grid of a NR RAN 100. The wireless communications device 110 sends or transmits 204 beam measurements for the beam it is currently using to communicate with a network node 120 of the NR RAN 100. The wireless communications device 110 will also send or transmit 204 measurements for one or more other beam candidates that it detects at its location in the beam grid of the communications system to the network node 120.

In some embodiments of method 200, rather than send beam measurements, the wireless communications device 110 sends a pilot signal to the network node 120. The network node 120 which receives the pilot signal can then use the pilot signal to make appropriate beam measurements for the candidate beams which the pilot signal from the wireless communications device 110 indicated were detectable at that location in the beam gird.

In some embodiments of method 200, the measurements made 202 by the wireless communications device 110 are on a set of channel state information reference signals, CSI-RSs, received from the network node 120. The beam measurement results from wireless communications device 110 are sent back to the network node 120. However, unlike in the prior art, where the best beam candidate among a plurality of measured beam candidates (where best was based on the measured beam characteristics such as signal strength) would be selected for future transmissions by the wireless communications device 110, method 400 takes into account the beam grid history to determine if a beam candidate should be selected. The disclosed embodiments first determine which beam candidates are available for selection based on their history in beam grid, the best beam candidate can then be selected from the group of one or more available beam candidates.

The selected candidate beam may be a direct beam candidate in a line of sight, LoS, from the network node 120 to the wireless communications device 110 or be a reflected beam candidate formed by a beam from the network node 120 which has been reflected by an object. The selected candidate beam may be a temporally dynamic beam or beam reflection if one or more selection conditions are met. The network node 120 which is the source of the beam and/or the object which reflects the beam can be mobile and be moving at the time the wireless communications device 110 transitions to the beam or beam reflection in some embodiments.

Examples of the types of beam measurements which can be made for beam candidates also include side beam measurements which enable the network node 120 to track a plurality of narrow beams by sending out reference signals in the form of channel state information reference signalling, CSI-RS, for each narrow beam that the network node 120 wants the wireless communications device 110 to measure. The number of beams that can be measured in this manner is limited by the time-division duplex, TDD, resource grid. One symbol is occupied for each measured beam which means that the more narrow beam measurements that are made, the fewer the symbol availability for use in data transmission, etc. Also the measurement report will occupy one UL slot. If there is no other spatially overlapping UE and the current UE does not have any data UL data to send, the UL slot will be wasted.

Another type of beam measurement is beam tracking on wider beams, where the wireless communications device 110 measures the synchronisation signal blocks, SSBs. The SSBs are sent out at a certain predetermined rate which allows measurements to be made quite frequently but nonetheless this is a fairly slow technique. In dense urban areas however, there are lots of obstacles that could obstruct and/or absorb beams. Although there may be also many reflections to provide good coverage, in some situations a beam may be only temporarily reflected and this can lead to issues such as increased bit error or radio link failure. In some situations, if a wireless communications device 110 is no longer able to use a temporally dynamic beam or temporally dynamic beam reflection, for example, if the beam suddenly fades, then this technique can be used to restore a connection between the wireless communications device 110 and the network node 120. However, if the reflection is from, for example a moving truck, and suddenly disappears, then the currently used narrow beam and it's corresponding wide beam might fade quickly away, then another recovery option is to use the 3GPP procedure called Beam Failure Recovery (BFR). This is a UE initiated beam failure recovery that involves a UE realizing the loss of connectivity, searching for a new best wide beam and to a random access on that wide beam.

Beam candidates which are not in a direct LoS from the network node 120 to the wireless communications device 110 are a form of beam reflection. Beam reflections can be categorised broadly as temporally dynamic beam reflections, temporally static, stationary, beam reflections, and temporally semi-static beam reflections.

Temporally dynamic reflections are a type of reflection which can be seen due to a moving object or semi static structures or vehicles. Generally, a temporally dynamic beam reflection will not be a reliable reflection to latch onto as temporally dynamic reflections can suddenly disappear causing the wireless communications device 110 to have to initiate a beam search again. A beam search as known in the art could involve performing an initial beam selection followed by transmission side-beam refinement and tracking. However, when the temporally dynamic beam reflection disappears, the beam tracking is not always fast enough to recover and latch onto another beam. If a temporally dynamic beam reflection disappears, this not only causes radio link failure and increased bit error rate but also it causes the wireless communications device 110 to measure more than necessary. This may not only result in wasting power and depleting the battery on the wireless communications device 110 but also waste precious network resources for measurements which might decrease average cell throughput.

Static reflections can be seen due to surrounding static structures and accordingly have a low likelihood of changing over time. In a high-bandwidth network, static reflections can impact beam selection when testing mobility. Static reflections are usually good to utilize to cover holes in coverage, however, it may be challenging to find next best beam to latch on since wide beam for these static reflections will not be adjacent to the wide beam of the position of the wireless communications device 110 in the beam grid (see FIG. 4 described later below for an example of how, as a wireless communications device 110 moves, its beam-grid position may change unexpectedly due to connection to a beam reflection).

As mentioned previously, known beam measurement techniques are typically performed in the spatial vicinity of the currently serving beam in the beam grid, meaning no viable candidate beams may exist in proximity to a beam using a beam reflection if a beam reflection suddenly disappears. Although it is possible for a wireless communications device 110 to find the correct wide beam after it leaves a current serving static reflection beam, as the likelihood of the correct wide beam is adjacent to reflected beam is low, the network node 120 uses the slower wide beam tracking to find a suitable candidate beam for the wireless communications device 110 to transfer to. It thus becomes a race of time before the currently served beam disappears. This not only incurs a risk as it could cause radio link failure and increased bit error rate but also it causes wireless communications device 110 to make a number of measurements to find a suitable candidate beam which would otherwise not be necessary. This can result in the wireless communications device 110 depleting its battery power source and may also waste precious network resources which can unnecessarily decrease average cell throughput.

FIG. 2B schematically illustrates a method of 300 generating a beam grid history according to some embodiments of the disclosed technology. In the example embodiment illustrated in FIG. 2B, the method 300 is performed by a network node 120 in a NR RAN 100, for example, by a gNB 120 in a 5G RAN, based on measurement data provided by a plurality of wireless communications devices 110 denoted as UE(s) in FIG. 2B. The output of method 300 is used by method 400 which is also performed by the network node 120 to determine a candidate beam (which term also includes candidate beam reflections) for a wireless communications device 110 to transition to in a beam grid of a communications network.

The network node 120 may comprise apparatus having the configuration shown schematically in FIG. 8 described later below in some embodiments. In some embodiments, as illustrated, the result of performing method 300 is a beam grid history for the beam grid of the NR RAN 100 which is used by a method 400 of determining a candidate beam 122 for a beam transition a beam grid of the NR RAN 100 by a wireless communications device 110. The term candidate beam is used equivalently herein to refer to both direct beams and/or to beam reflections unless the context clearly dictates otherwise.

As shown schematically in FIG. 2B, in some embodiments method 300 comprises monitoring 302 beam data collected from a plurality of wireless communications devices 110 at various locations in a beam grid. The beam data may comprises beam measurements that each wireless communications device 110 has taken or, alternatively, pilot signals from each wireless communications device 110 which the network node 120 then uses to make beam measurements.

The position of each wireless communications device 110 in the beam grid is also monitored 304. A beam state counter for wireless communications device 110 is initialised 306 to enable the transitions between different beams to be tracked for each wireless communications device 110 as the wireless communications device 110 moves in the beam grid. The paths taken by each wireless communications device 110 in the beam grid are also monitored 308 and a state counter is updated 310 with the frequency of each state transition made by a wireless communications device 110. The distribution of the beam state transitions by the plurality of wireless communications devices 110A, 110B, 110C in the beam grid is determined 312 and used to determine 314 the beam state transition probability for the paths of the wireless communications devices 110 in the beam grid and this is used to form a beam grid history which is stored for use by a method 400 according to the first aspect, for example, as shown in FIG. 2C.

FIG. 2C shows a method 400 according to the first aspect, for example, a computer-implemented method 400, performed by a network node 120, for determining a candidate beam for a beam transition by a wireless communications device 100 in a beam grid, the method comprising: monitoring beam tracking data from a plurality of wireless communications devices 110 at a plurality of locations in the beam grid over a period of time, generating a beam grid history comprising monitored beam tracking data; and determining, based on at least the beam grid history and current beam measurement data received from a wireless communications device 110 at a location in the beam grid, at least one candidate beam for a beam transition by the wireless communications device 110. The sending indication of the selected candidate beam is then sent 422 to the wireless communications device 110.

A beam grid history for the beam grid of a wireless communications system comprises a plurality of beam measurements by one or more wireless communication devices over a plurality of locations and points in time. In some embodiments, the beam grid history indicates which beam indices were found in which cell locations. The beam grid history may include beam transfer information in some embodiments which trace out a path in the beam grid taken by one or more wireless communications devices as they navigate within the wireless communications system.

In some embodiments, determining the at least one candidate beam comprises determining 418 the availability of a set of one or more available candidate beams, and selecting a candidate beam from the set of one or more available candidate beams based on one or more selection criteria met by the selected candidate beam.

In the illustrated embodiment of FIG. 2C, the method 400 comprises obtaining 402 beam data from a wireless communications device 120 (denoted UE in FIGS. 2B & 2C) and determining 406 a current beam state. A current position and predicted path of the wireless communications device 110 in the beam grid is also determined 408. The beam state transition probability for the predicted path is then obtained 410 using the beam grid history obtained using method 300.

In some embodiments, the method classifies, based on the beam grid history at the location in the beam grid where the candidate beam is received by the wireless communications device 110, the candidate beam as a static candidate beam or a temporary candidate beam.

As shown in the schematic embodiment illustrated in FIG. 2C, the method then determines 412 a set of one or more candidate beams, and determines 414 a probability of each candidate beam being a temporally dynamic beam or beam reflection. The candidate beams are then filtered 416 based on one or more selection criteria. For example, a selection condition may be set to remove all temporally dynamic beam reflections.

Some embodiments according enable selection of available static candidate beams such as a temporally static reflection of a beam from a static reflector as well as enabling a temporary candidate beam such as a temporally semi-static beam reflection of a beam from a semi-static reflector to be selectable as an available candidate beam. Some embodiments also allow a temporary candidate beam is a temporally dynamic beam from a mobile network node 120 to be selected.

In some embodiments, the determined 418 availability of a candidate beam for a beam transition is based on a beam transition probability distribution determined 314 along at least one predicted path in the beam grid from the location of the wireless communications device 110.

Alternatively, a selection condition may be based on the relative movement speed of the wireless communications device 110 and the predicted duration and stability of the temporally dynamic beam candidate. The available candidate beams for the wireless communications device 110 to transition to are then suitably assessed, for example, based on their signal strength, and the best available candidate beam is selected for the wireless communications device 110 to transfer to in the beam grid and signalled 422 to the wireless communications device 110.

In some embodiments of method 400, the method further comprises determining the beam transition probability distribution by determining a plurality of sequences of beam transitions by at least one wireless communications device 100A, 100B at a plurality of locations in the beam grid history.

In some embodiments of method 400, the availability of a candidate beam is based on a frequency of appearance of the candidate beam in the beam grid history at the location of the wireless communications device 100.

In some embodiments of method 400, monitoring the beam tracking data comprises monitoring a pilot signal from a wireless communications device 100 wherein the stored beam tracking data for the plurality of beams comprises stored beam measurement data determined by the network node 120 based on the pilot signals received from a plurality of wireless communications devices 110.

In some embodiments of method 400, the monitored beam tracking data comprises beam measurement data measured by the wireless communications device 110 and sent to the network node 120.

In some embodiments of method 400, determining the availability of a candidate beam indicates the candidate beam is unavailable for a beam transition by the wireless communications device 110 at the location in the beam grid. The method 400 then includes one or more or all of the steps of method 300, for example, monitoring 302 the beam grid history over a period of time; and based on monitored beam grid history data including the unavailable candidate beam at the location over a period of time and based on subsequent beam measurement data for the candidate beam at the location taken by another wireless communications device 110C, determining 418 the candidate beam at that location is available for a beam transition by the other wireless communications device 110C.

FIGS. 3A to 3D illustrate schematically a wireless communications device 110 executing a sequence of beam transfers in a NR RAN 100 according to some embodiments of the disclosed technology. FIGS. 3A to 3D illustrate how a network node 120 such as a gNB processes static and dynamic reflection data during a beam tracking phase in order to perform wide beam selection based on a network node 120 or a wireless communications device 110 beam measurement result, the movement path of the wireless communications device 110 and historical temporally dynamic beam data, such as temporally dynamic beam reflection data. In the drawings, the differently dashed ovals are fixed beams from radio. The correspondingly dashed ovals are beam reflections from the correspondingly fixed beams, and the numbers are the beam indices.

Figures 3A, 3B:
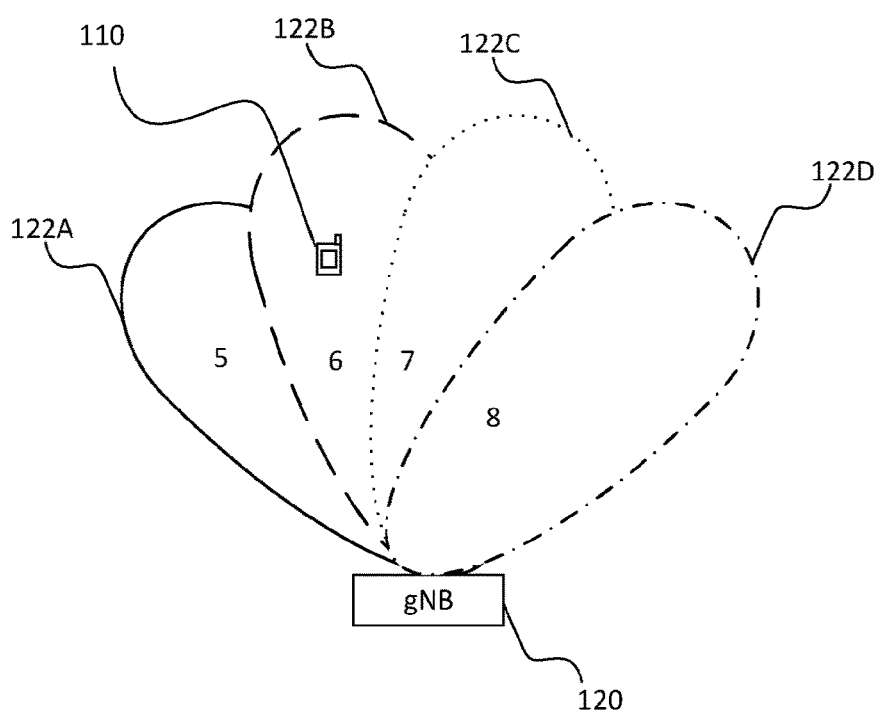
FIGS. 3A to 3D illustrate a sequence of beam transfers in a radio access network according to some embodiments of the disclosed technology.

FIG. 3A shows the wireless communications device 110 within the coverage of beam 122B which is labelled with beam index 6 provided by a network node 120 (for example, a gNB as indicated in FIGS. 3A to 3D). Network node 120 is a source in this illustrate example for four beams 122A, 122B, 122C, and 122D, however, as will be appreciated by anyone of ordinary skill in the art, the number of beams shown should not be considered limiting to the number of in other embodiments.

Each beam is also labelled with a beam index 5, 6,7 8 from left to right in FIGS. 3A to 3D. The beam index is also denoted in the corresponding schematic beam grid diagram of FIG. 4. FIG. 4 is described in more detail later and shows the path of the wireless communications device 110 in the beam grid which corresponds to the movement of the wireless communications device 110 along the path illustrated schematically in FIGS. 3A to 3D.

In FIG. 3A, a wireless communications device 110 and a network node 120 communicate using a connection formed by beam 122B (in other words, beam index 6 is used for the communication). The network node 120 periodically or at other suitable intervals requests the wireless communications device 110 to perform a beam measurement, for example, to measure SSBs on the beams the wireless communications device 110 can detect in order for the network node 120 to track the movement of the wireless communications device 110 in the beam grid. During the beam tracking, the wireless communications device 110 sends several best beam measurements to the network node 120.

FIG. 3B shows a later point in time where the wireless communications device 110 has moved to the right within an area covered by beam 122C, beam index 7 and is denoted 110' in FIG. 3B. The wireless communications device 110 sends beam measurement reports for both beam 122C, beam index 7 and also for the temporally dynamic reflection 126 of beam 122B, beam index 6 off a mobile or moving object or reflector 124 such as a side of a large vehicle or truck. Many other examples of a mobile reflector 124 such as train or the like exist, as those skilled in the art will appreciate.

In order for network node 120 to filter the beam measurement information it receives from the wireless communications device 110 to remove any candidate beams or candidate beam reflections which are unsuitable for the wireless communications device 110 to transfer to, a beam grid history for the communications network is used, for example, a beam grid history such as method 300 shown in FIG. 3 may produce. In this example, the mobile reflector is fast-moving and there is no history in the beam grid of any other wireless communications devices 110 using beam index 6 at that geographic location. The network node 120 accordingly removes it from the candidate beam set for the wireless communications device 110 to transfer to, and selects beam index 7 as this is the only other candidate beam at that location for the wireless communications device 110 to use. In this way, even if the beam measurements received by the network node 120 indicated the temporally dynamic beam reflection 126 with beam index 6 had a stronger signal strength at that location than the signal strength of beam 7, it would still not be considered available for selection as a candidate beam. In some embodiments, the beam candidate is removed or filtered from the available candidate beam set based on the beam grid history indicating that it was a temporally dynamic beam reflection and not a static or sufficiently semi-static beam reflection.

Figure 3C:
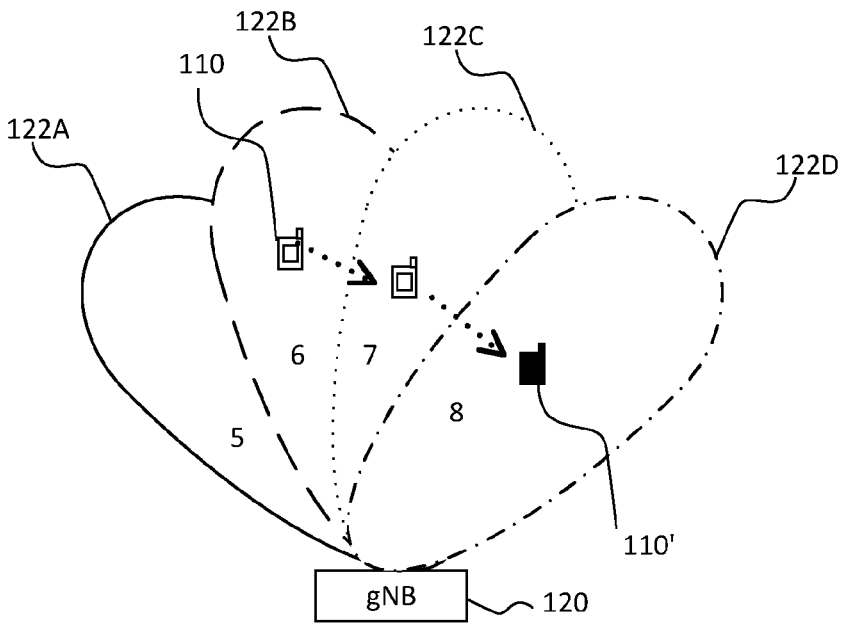
Figure 4:
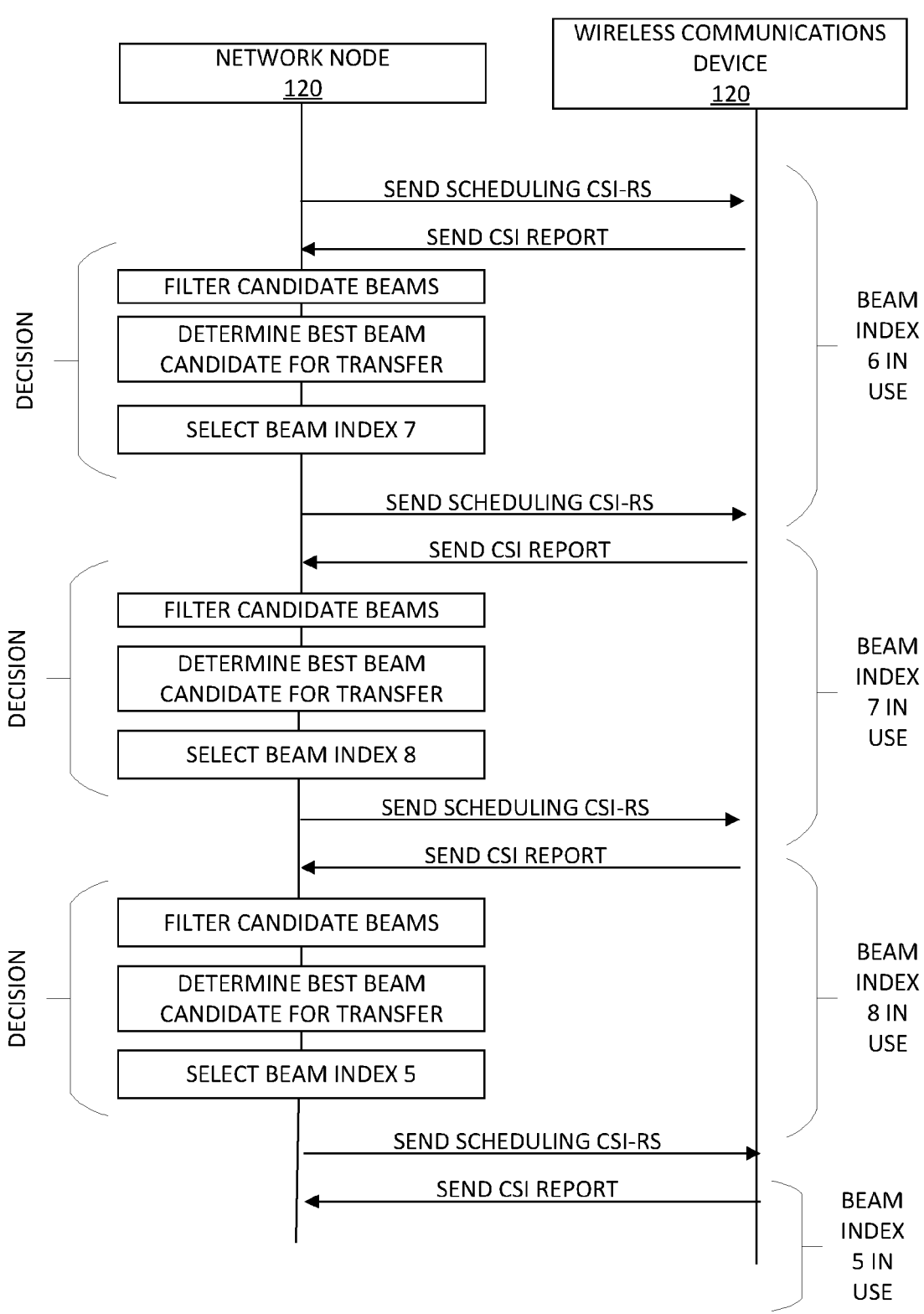
FIG. 4 illustrates schematically a flow chart illustrating an example of beam selection according some embodiments of the disclosed technology.

Consider also a situation where the wireless communications device 110 continues to move and as FIG. 3C shows, enters the area of coverage of beam 122D, beam index 8 (where it is denoted as 110' again). The beam measurement reports by the wireless communications device 110' indicate that beam 8 is the only beam candidate so the network node 120 selects beam index 8 for data transmissions by the wireless communications device 110.

Figure 3D:
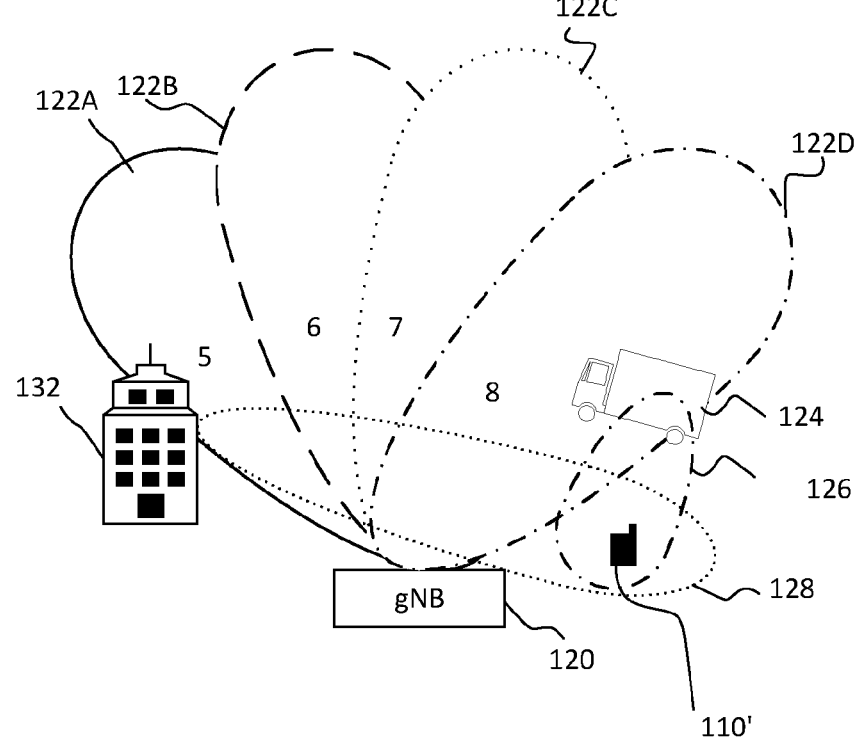

FIG. 3D illustrates schematically a situation where the wireless communications device 110 moves out of the network coverage area serviced by beam index 8, to a region where there is no beam coverage. However, due to beam reflections, a beam connection with the network node 120 could be maintained for a little longer. In the example illustrated in FIG. 3D, the beam measurements by the wireless communications device 110' indicate two different beam reflections are present at its location. The reflection from beam 122D, beam index 8, is a temporally dynamic beam reflection 126 originating from another fast moving reflector or object 124, such as a truck as is illustrated in schematically in FIG. 3D. The reflection 128 from beam index 5 however is a temporally static beam reflection. The temporally highly-dynamic beam reflection 126 has no history in the beam grid at that geographic location, whereas the static beam reflection 128 does (meaning it has been used before for a transfer). Other characteristics of the static beam reflection 128 may also affect its suitability and availability for selection by the network node 120. In this case, however, even though the beam reflection 126 from beam index 8 has a stronger signal strength, the network node 120 will select to use the reflection from beam 5 as this is static and more stable.

FIG. 4 shows schematically a flow chart for the decision process the network node 120 makes in situations like those show schematically in FIGS. 3A to 3D, and the decision process results in the same path in the beam grid taken by the wireless communications device 110 in FIGS. 3A to 3D. In FIG. 4, the wireless communications device 110 is initially in a connected state and in a cell in the beam grid where beam index 6 is being used for communications between the network node 120 and the wireless communications device 110. In this illustrated embodiment, the network node 120 sends the scheduling CSI-RS to the wireless communications device 110 and the wireless communications device 110 responds with a CSI report. A decision is then made about whether a new beam is to be selected for the wireless communications device 110 to transition to by performing a method according to the first aspect, such as the method illustrated in FIGS. 2B and 2C, in which, for example, the decision filters out unsuitable candidate beams from the candidate set of beams indicated in the CSI report from the wireless communications device 110 and determines the candidate beam the wireless communications device 110 is to transfer to based on the remaining candidate beams in the beam candidate set.

In some embodiments, the final decision is also based on a number of candidate beam selection conditions being met by available candidate beams, such as their signal strength. However, in some embodiments, the movement path of the wireless communications device 110 may indicate a particular beam candidate is more suitable as the wireless communications device 110 may later be able to transfer to a stronger beam and/or that particular candidate beam may support a connection for longer with the wireless communications device 110 along its predicted path. If any unexpected beams or beam reflections are detected, then the beam grid history can be checked for historical data.

By checking the beam grid history for any unexpected beams that have been reported by the wireless communications device 110 at a particular location, the availability and suitability of any temporary beam reflections or temporary beams can be assessed by the network node 120.

In some embodiments, based on the assessment the network node 120 performs based on on the beam measurement data, the beam grid history, and the predicted path of the wireless communications device 110, unsuitable beams for the wireless communications device 110 can be filtered from the set of candidate beams for the wireless communications device 110 to transfer to. The network node 120 can then determine which of the remaining candidate beams (or beam reflections) is the best candidate for the wireless communications device 110 to transfer to and this selection is included in the scheduling CSI-RS sent to the wireless communications device 110. When the wireless communications device 110 receives the CSI-RS information, it switches to a connection over beam index 7 and sends back its next CSI report using that beam connection.

At some point, the CSI report indicates that the wireless communications device 110 has moved into the area illustrated schematically in FIG. 3C, in which case the beam measurement data will indicate beam 122C with beam index 8 has the stronger signal over beam index 7, and the decision is taken to switch the connection to use beam index 8 the next adjacent cell to the right of the cell using beam index 7 in the beam grid.

At some later point in time, however, the wireless communications device 110 will move outside the service area of beam 122D, such as FIG. 3D illustrates schematically. At this point, the beam measurement information that is included in the CSI report sent by the wireless communications device 110 to the network node 120 will now include measurements for the two reflections 126 and 128 shown in FIG. 3D.

In this case, the decision, based on the beam grid history, the predicted moving path of the wireless communications device 110, and also on one or more characteristics of each beam reflection 126, 28 included in the beam measurement data (for example, each beam reflections' signal strengths or their relative signal strengths included in the CSI report) the network node 120 decides what beam indices are to be considered available for the wireless communications device 110 to transfer to. In the example illustrated in FIG. 4, the result of the decision is to select the static reflection 128 of beam 122A (beam index 5 in FIG. 3D) despite its signal strength being less than that of the temporally dynamic reflection 126 of beam 122D. The movement of the wireless communications device 110 in the beam grid is also shown schematically in a beam grid in FIG. 5.

In FIG. 5, twelve different wide beams are shown as cells in a beam grid. As the wireless communications device 110 (shown as a UE in FIG. 5) moves (shown schematically by the solid arrows) from a cell using beam index 6 for communications with the network node 120 to an adjacent cell where it uses beam index 7 for communications, a path can be mapped out in the beam grid. in the same way that the wireless communications device 110 moved from beam to beam in FIGS. 3A to 3D, in FIG. 5, the path of the wireless communications device 110 moves through the cell with beam index 6 to the cell with beam index 7, and then to a cell using beam index 7 and on to the cell using beam index 8. However after the wireless communications device 110 has moved out of the coverage of beam 8, in other words, off to the right of the beam grid coverage area of FIG. 5, the wireless communications device 110 transfers suddenly use beam index 5 for communications with the network node 120 as a result of a reflection of beam index 5 off the building shown schematically in FIG. 3D.

The dotted arrowed line indicates a reflection from beam index 5 has been selected. The wireless communications device 110 positions where beam measurements are taken in the beam grid which are indicated as P-1, P-2, P-3, and P-4 in FIG. 5 and are not to be confused with the geographic location of the wireless communications device 110 which may continue in a straight line in the real world.

As a wireless communications device 110 starts to move from cell to cell in a beam grid, a network node 120 can track its movements until the point where the wireless communications device 110 moves out of the beam grid as there is now no beam for the network node 120 to track its movements. In the schematic example of FIG. 5, however, whilst still in the coverage area of beam index 8, the network node 120 receives a CSI measurement report from the wireless communications device 110 which includes a measurement for the reflection 128 of beam 122A.

By referring to the beam grid history information that method 300 generates, the network node 120 selects this as a static reflection candidate beam for the wireless communications device 110 to transfer to. This is shown in FIG. 5 by the path of the wireless communications device 110 in the beam grid now moving to indicate the wireless communications device 110 is using beam index 5 after previously using beam index 8.

Although in the real world, as the wireless communications device 110 continues to move to the right, it eventually will move out of the area covered by the static beam reflection 128 shown in FIG. 3D, by using the static reflection 128, rather than the dynamic beam reflection 126, the connection with the network node 120 is maintained for longer.

Those of ordinary skill in the art will appreciate that in the above example embodiments, instead of the wireless communications device 110 sending beam measurements to the network node 120, it is possible for just pilot signal data to be sent by the wireless communications device 110 and for the network node 120 to determine the relevant beam measurement information from the pilot signals.

As mentioned above, a temporally dynamic beam may also comprise a direct beam from a temporary or mobile network node 120 such as a drone gNB. One or more such mobile network nodes 120 may be provided temporarily to provide additional network coverage for events where a large number of users may congregate, such as festivals, races, and the like. In the above scenario, if a beam measurement by a wireless communications device 110 indicates a new beam index at a location, the beam grid history for that location will not at first include the temporary beam, but as more mass participants detect the mobile drone beams, the beam grid history will reflect this. In this case, to ensure rapid utilisation of the temporary beam, the monitoring of a beam may be used to indicate availability based on a number of detections of mobile beams in a short period of time rather than require longer monitoring periods. Alternatively, in some embodiments, the beam grid may be monitored 300 for a period of time in the beam grid, for example, prior to the event for which the additional network coverage is to be provided, so that its stability and presence at that location enable it to be selected based on its newly established beam grid history. Temporally dynamic beam reflections may also be semi-static from time to time, in which case, they may be useful to use.

FIG. 6A illustrates schematically an example of a semi-static beam reflection 136 which may occur, for example, when a beam 122 is reflected off an object or reflector which is mobile but which, at the time the wireless communications device 110 makes its beam measurement, is temporarily stationary. In the example scenario in FIG. 6A, the semi-static object or reflector 134 is a truck which is regularly parked at a certain location for an hour, for example, from noon to 1 pm every day. The truck accordingly is a static surface for at least 3600 seconds every day and the beam reflected from its surface is accordingly also static for that length of time. This means that, during the period of time when the beam is stationary, if a wireless communications device 110 is located in an area where a direct LoS beam 122 from a network node 120 is obstructed by some obstacle 142, but is able to receive the semi-static reflected beam 136 from the truck reflector 134, it could improve the network coverage.

The above example duration is for illustrative purposes only as semi-static reflectors may provide viable reflection candidate beams for much shorter or longer durations of time. By performing the beam candidate filtering of dynamic reflections part of the decision process to select the best available beam candidate sufficiently rapidly, in other words on a timescale which is faster than the current beam being used is fading and/or the user equipment is moving, semi-static reflections 136 may be considered sufficiently stable in relative terms to be considered selectable based beam candidates on their prior appearances in the beam grid history. If the assessment is not done rapidly enough, and especially if it takes more time than the reflection from the mobile reflector is stationary, then the reflection 136 from the semi-static object 134 will never be considered an available candidate and so will never be selected.

A threshold for the amount of time that an unexpected beam index is found in the beam grid may be set in some embodiments to ensure that any temporally dynamic beam or beam reflections are sufficiently stable. This threshold could be set as a duration of time, or, for example, set in terms of time-spans for consecutive beam measurements of the order of, say, 5 seconds. If a wireless communications device 110 sends beam measurement reports which indicate a beam has been found repeatedly in each beam measurement time span, for perhaps two separate time-spans or 10 seconds, then the network node 120 will classify that beam or beam reflection as a candidate beam which is semi-static.

In some examples, the reflector object 134 may not be totally static but the reflection it creates may nonetheless appear static or be sufficiently semi-static to be useful for communications with the wireless communications device 110. For example, if the relative speed of a mobile reflector 134 is sufficiently slow compared to the speed of the wireless communications device 110, it is possible for reflections from that mobile object to be viable semi-static beam candidates. The term semi-static according covers temporarily stationary beam reflections and beam reflections where the relevant movement between the wireless communications device 110 and the reflector 134 is sufficiently low for a duration of time. In other words, in some embodiments, the threshold for a beam to be considered semi-static and available as a candidate beam varies based on the relative speed of the semi-static reflector and the wireless communications device 110.

As an example, consider a semi-static reflector 134 which is a train or a large truck with, say, a 16 meter long trailer is moving at a very slow speed past a wireless communications device 110. If the truck is moving at 3.2 m/s or less, then a reflection 136 from beam 122 of the trailer 134 could be detectable for several 5 s time-spans separating beam measurements by the wireless communications device 110. If the truck was moving far more quickly, then the reflection would disappear after one or two 5 second beam measurement time spans. At this point, the wireless communications device 110 detect the trailer has disappeared between two measurement periods, for example, of 40 ms.

Accordingly, if the network node 120 uses 5-10 seconds of consecutive measurements before classifying the newly added truck as a semi-static beam the semi-static beam could be made available for wireless communications device 110 to use for the remaining ~3590 seconds whilst the truck is stationary. In some embodiments, the threshold for a beam reflection to be considered semi-static is a time constant which is configurable in the machine-learning algorithm but in some embodiments, it is baked in to the machine learning algorithm in terms of adoption rate of the online training.

It is also possible for a detected beam or beam reflection to fade very suddenly and be lost between two consecutive measurements. FIG. 6B illustrates schematically an example of a specular temporally dynamic beam reflection. Most reflections in the mm waveband are specular. In the example shown schematically in FIG. 6B, the reflector is a fast moving object such as a truck moving at speed along a road. The specular nature and speed of the truck mean that the beam is very likely to be lost between two beam measurements. This beam would accordingly not be selected as an available beam candidate as the reflection will fade too fast.

In some embodiments, beam reflections are identified and classified as temporally static or dynamic based on the beam grid history data. Additional data may also be used to classify a beam as temporally static or dynamic, such as, for example, the beam-based downlink (DL) reference signal received power (RSRP) measurements, the mobility history and/or position of the wireless communications device 110, historic beam selection pattern(s), and other user experience key performance indicators using statistical or machine learning techniques.

In some embodiments, after classification of a beam as temporally static or dynamic direct beam or beam reflection, the resulting classification of the current beam type, for example, whether this is a static beam or reflection or a dynamic beam or reflection, is fed back into a beam management algorithm which is used to perform the decision process shown schematically in FIG. 5. Examples of such an algorithm may be implemented using a suitable machine learning or statistical algorithm, such as those described later below.

Figure 7:
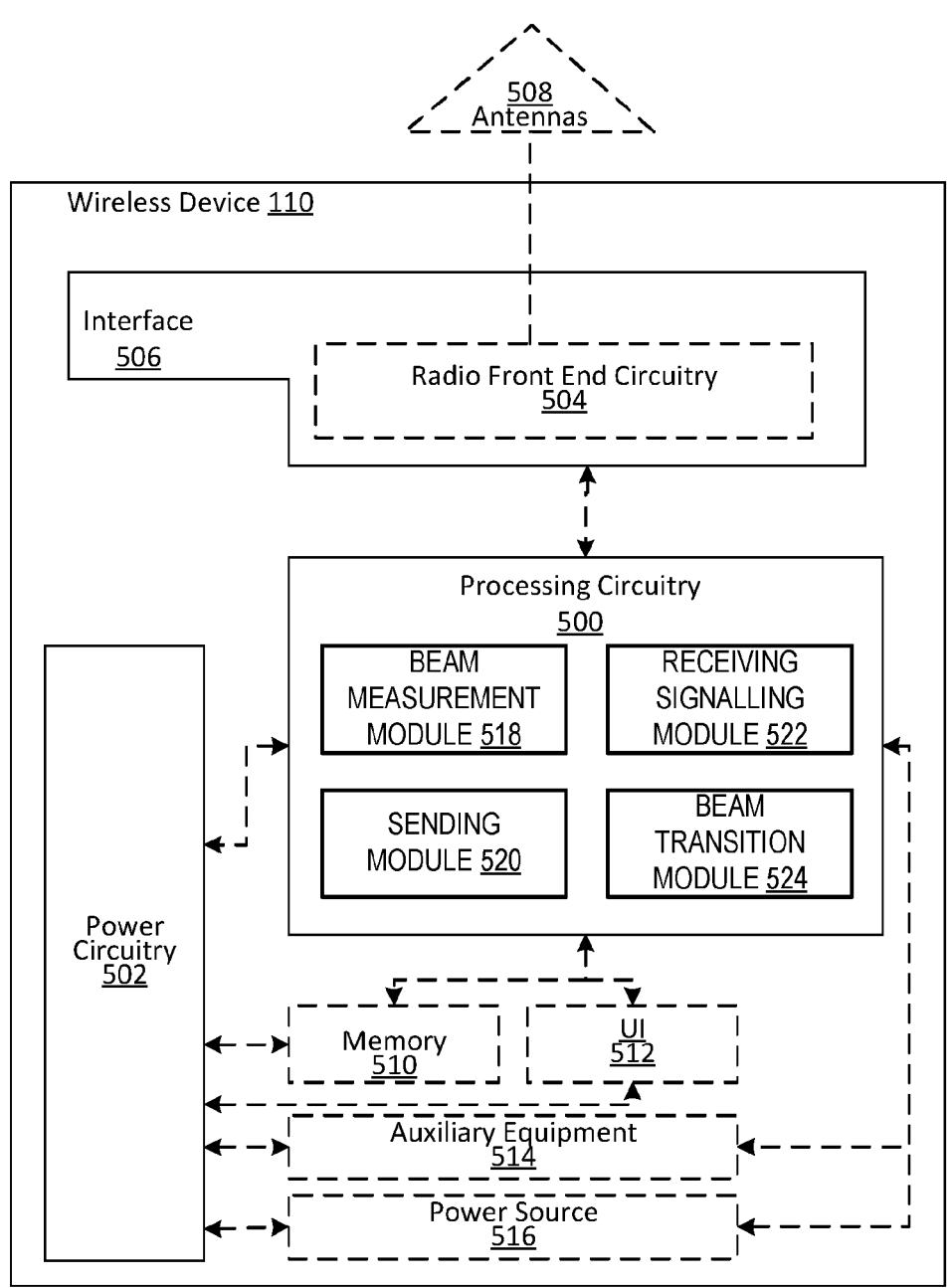
FIG. 7 illustrates schematically an example embodiment of a wireless communications device according to some embodiments of the disclosed technology.

FIG. 7 illustrates schematically an example embodiment of a wireless communications device according to some embodiments of the disclosed technology. In FIG. 7, wireless communications device 110 comprise processing or control circuitry 500 which includes computer-executable instructions for implementing a disclosed embodiment of the method of the second aspect, for example, a method 200 as illustrated in FIG. 2A of the drawings. The processing circuitry comprises in some embodiments, a beam measurement module 518, a sending module 520 for sending beam measurements, for example, sending CSI reports to a network node 120, a receiving module 522 for receiving CSI-RS messages or signalling from the network node 120, and a beam transition module 524 which processes the received instructions from the network node 120 to transition subsequent communications with the network node 120 over a connection with a different beam index. The beam measurement module 518 in some embodiments makes beam measurements but in some embodiments merely sends a pilot signal information for any beams detected to the network node 120 and this is then available for the network node 120 to use to generate beam measurement information.

Also shown schematically in the example embodiment illustrated in FIG. 7 is the beam antenna array 508 of the wireless communications device 110 for receiving mm waveband beam communications. In some embodiments, the wireless communications device 110 has one or more antennas configured to receive communications at other wavelengths, an interface 506 between the antenna array 508 and radio front end circuitry 504. The processing or control circuitry 500 is powered by power circuitry 502 which also powers memory 510, a user interface 512, any other auxiliary equipment on the wireless communications device 110, and a power source 516, which is typically a battery but also be provided using solar cells or the like. Memory 510 may take any suitable form known in the art to be suitable memory for such a wireless communications device 110. In some embodiments, the memory 510 may comprise a computer readable storage medium storing computer code, which when loaded and executed by one or more processors or processing circuitry of wireless communications device 110 causes the wireless communications device to perform a method according to the second aspect.

Figure 8:
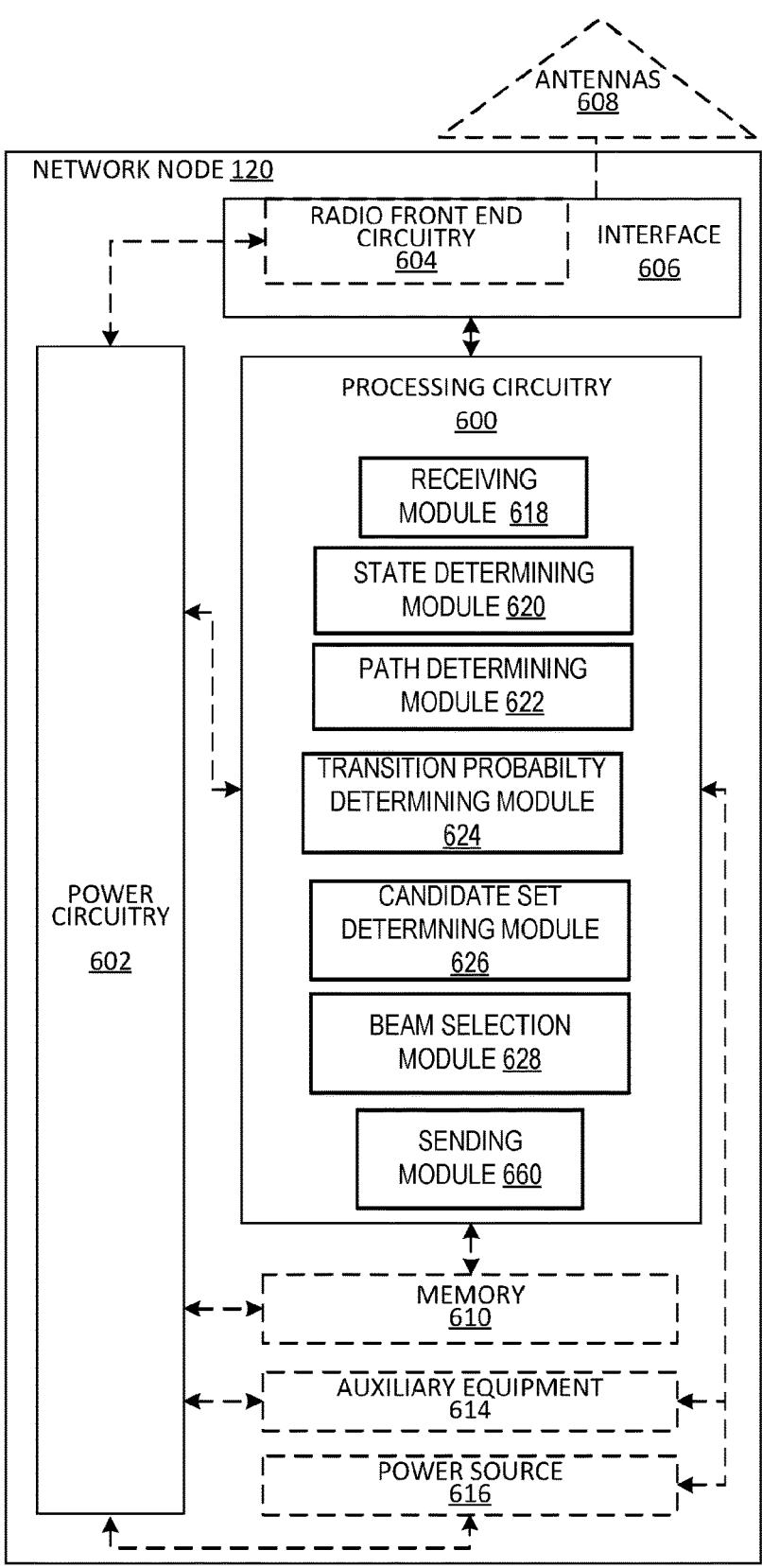
FIG. 8 illustrates schematically an example of a network node according to some embodiments of the disclosed technology.

FIG. 8 illustrates schematically an example of a network node 120, for example a gNB, according to some embodiments of the disclosed technology. In the illustrated embodiment, the network node 120 comprises processing or control circuitry 600 which is configured perform a method according to the first aspect or any of its embodiments. In some embodiments, the processing or control circuitry is configured to execute machine-executable instructions to implement any of the disclosed method embodiments, for example, a method according to the first aspect which are held in memory 610. Memory 610 may take any suitable form known in the art and in some embodiments comprises a computer readable storage medium storing computer code, which when loaded and executed by the one or more processors or processing circuitry of the network node 120 causes the network node 120 to perform a method according to the first aspect or any of its preferred embodiments. The processing circuitry 600 is connected to power circuitry 602, which draws power from a suitable power source 616. The processing circuitry 600 may also be configured to use auxiliary equipment such as sensors and the like 614 in some embodiments. An beam antenna array 608 is provided to enable beam communications at the mm waveband with a plurality of wireless communications devices 110 in a NR RAN 100. The antenna array 608 is connected via interface 606 with radio front end circuitry 604. The radio front end circuitry 604 may be provided as a different component or integrated into the processing circuitry 600. Processing circuitry 600 control the delivery of data and may also control power to the radio front end circuitry 604 via the same or different interfaces. In some embodiments, the radio front end circuitry 604 may be powered directly by power circuitry 602. The antenna array 608 may also support communications at wavebands other than the mm range and/or additional antenna arrays may be provided in some embodiments.

The form factor of the network node 120 may be any known to someone of ordinary skill in the art which is suitable for the provision of beam communications. The network node 120 provides base station functionality in some embodiments, and may be referred to as a base-station, either as as a stand-alone network node 120 or as part of a distributed network node.

If the network node 120 is a mobile network node 120, then machine executable instructions for implementing a method according to the first and/or the second aspect may also be held in memory to allow beam communications with another network node 120. For example, the machine executable instructions may comprise computer code stored in a computer readable storage medium which, when loaded and executed by one or more processors or controller or processing circuitry or control circuitry of a network node 120, causes the network node to perform a method according to the first aspect or, if the network node is to communicate instead with another network node, according to the second aspect.

As illustrated schematically in FIG. 8, the processing circuitry 300 executes machine-executable instructions comprising a plurality of modules. In the illustrated embodiment, the modules comprise a receiving module 318 configured to receive beam measurements or pilot signals from the wireless communications device 110; a state determining module 320 for determining a current beam state; a path determining module 322 for determining a predicted path of the wireless communications device 110; a module 324 for determining the beam transition probability; a module 326 for determining a set of available candidate beams for the wireless communications device 110 to transfer to based on the beam grid history, the beam measurement information, and the predicted beam path; a module for selecting the best beam; and a module 330 for sending the selected candidate beam for the wireless communications device 110 to transfer to in, for example, a scheduling CSI-RS message to the wireless communications device 110.

In some embodiments, the network node 120 is configured to determine a candidate beam for a beam transition by a wireless communications device 100 in a beam grid and comprises means for monitoring 302 beam tracking data from a plurality of wireless communications devices 110 at a plurality of locations in the beam grid over a period of time; means for generating 316 a beam grid history comprising monitored beam tracking data; and means for determining 418, based on at least the beam grid history and current beam measurement data received from a wireless communications device 110 at a location in the beam grid, at least one candidate beam for a beam transition by the wireless communications device 110.

Further details of the functionality which the modules shown in FIG. 8 perform to implement some embodiments of the first method aspect will now be described.

In some embodiments, the network node 120 comprises a gNB which is configured to categorize beam reflections into temporally dynamic or temporally static reflections by monitoring 302 beam measurement data and recording the measurements to form a beam grid history over a suitably long period of time, such as a few days. A statistical model may be used or a machine learning model may be trained to determine a beam transition probability distribution based on beam measurements in the beam grid history for the monitored period. Examples of suitable machine learning algorithms are well known to someone of ordinary skill in the art, for example a state machine may be used. In some embodiments, the beam tracking data in the beam grid history is used by the machine learning model to identify patterns of available candidate beams comprising temporally static or semi-static beam reflections in the beam grid. By identifying patterns of static reflection and dynamic reflection based on the beam tracking the beam grid history can be used to classify beam measurements reported by a wireless communications device 110 as belonging to a static or dynamic beam or beam reflection, and determine the availability of the beam as a candidate beam for a beam transfer at the current location of the wireless communications device 110 accordingly.

In some embodiments, the beam tracking data in the beam grid history is used by the machine learning model to identify patterns of available, in other words suitable, candidate beams comprising temporally static or semi-static beam reflections in the beam grid.

In some embodiments, the beam tracking data in the beam grid history is used by the machine learning model to identify patterns of unavailable, in other words, unsuitable, candidate beams comprising temporally dynamic beam reflections in the beam grid.

It is also possible for a machine learning module to use another feature like a block error rate, BLER, or signal interference plus noise ratio, SINR, and machine learning to identify patterns of available or unavailable candidate beams.

The machine learning model may be configured to remove from the determined beam transition probability distributions, one or more probability distributions for a transition to an unavailable beam.

In some embodiments, the machine learning algorithm has a feedback loop to learn from the beam transfer decisions which the network node 120 makes over the monitoring period which filters out from any candidate beam set all dynamic reflections which should not be considered suitable for inclusion based on at least their temporal stability.

In some embodiments, in addition at least one other beam measurement characteristics such as their current beam strength history captured in the beam grid history is used to determine the candidate beam the wireless communications device 110 is to transfer to. Once the machine learning algorithm has been trained for a local cell using a particular beam index, the network node 120 is able to send (for example as signalling or in some other suitable message format) a suitable control signal to order the wireless communications device 110 to either continue to use the current beam index for future communications or to switch to use the beam index for the beam the machine algorithm has determined to be the best available candidate beam for a transfer based on its learning about temporally dynamic reflections and beams in that cell.

In some embodiments, the machine learning model models each beam in the beam grid as a state of the beam grid and models each transition by a wireless communications device 110 at a location in the beam grid as a state transition at that location, wherein each state holds a counter of all exit transitions from that state and their frequencies.

In some embodiments, when a wireless communications device 110 performs an exit transition from a state to a next state at a location in the beam grid, the state transition is recorded by updating the counter of exit transitions from the state in the beam grid history and updating a counter for the next state of the wireless communications device 110 transitioning from the state in the beam grid history.

In some embodiments, the solution is based on a state machine in which, in the simplest form, there is one state per beam. The state machine module 620 comprises computer-executable instructions for implementing the state machine in some embodiments. The current state corresponds to the current active beam, and each beam switch corresponds to a state transition. Assuming a Markov property, each beam switch only depends on a limited history. Each state holds a counter of all exit transitions, together with their frequencies. For each UE and each state transition, the transition is recorded in the exiting state and a counter corresponding to the next state is incremented. In other words, each state in the beam grid history may be represented by a count or sequence of previous beam transitions.

The machine learning model may identify or classify a candidate beam as an available or unavailable beam based on a history of state transitions to the candidate beam at the location of the wireless communications device 110 in the beam grid in some embodiments. For example, the machine learning model may identify or classify a candidate beam as an available static or temporally semi-static reflection candidate beam by determining the probability distribution of the historic state transition from the current beam to the candidate beam. Based on the determined probability distribution of the candidate beam meeting a condition for classification of the candidate beam as a static or temporally semi-static reflection candidate beam, the machine learning model then determines the static or temporally semi-static reflection candidate beam is available for a beam transition by the wireless communications device 110. A static or temporally semi-static reflection candidate beam may be selected for the wireless communications device 110 to transition to based on predicting at least one path of the wireless communications device 110 in the beam grid and then determining, based on the beam grid history, for the most probable predicted path, an initial static or temporally semi-static reflection candidate beam. In some embodiments, the initial static or temporally semi-static reflected candidate beam is then selected if, based on beam measurement data at the location of the wireless communications device 110 in the beam grid, the static or temporally semi-static reflected beam is determined to meet one or more selection criteria for the duration of the beam and the strength of the beam.

In a more advanced realization of an embodiment where the model comprises a state machine, each state represents a sequence of beam transitions. A prediction if a certain beam is static or dynamic involves looking at the probability distributions of the possible state transitions.

Example: state_7: {state_6: 500, state_8: 499, state_31: 1}

The example shows the state information for state_7. There has been 500 transitions_from_state_7 to state_5, 499 transitions to state_8, and one transition to state_31.

In order to avoid selecting a dynamic reflection, the process of deciding which state to switch to which, for example, the beam selection module 628 performs in some embodiments, includes the state information. In this case, it is very likely that the transition from state_7 to state_31 is temporary in nature, since it has only happened in $\frac{1}{1000}$ of the previously seen cases. It will be ignored with high likelihood.

In some embodiments, semi-static and static reflections are made available for selection as beam candidates. Each state encodes the latest beam transitions. Which paths followed by a wireless communications device 110 were successful in the sense that a connection with the network node 120 was maintained and which paths led to problems, such as loss of signal, can accordingly be taken recorded and so taken into account when assessing semi-static and static reflections. In an exploitation phase, the next best available beam, and in some embodiments, a next best available beam sequence, can be learnt based on what has worked best in the past, which means that beams can be selected regardless of their position in a spatial sense in the beam grid.

In some embodiments, the duration a wireless communications device (110) is in each state between beam transitions is recorded.

The initial training may be done offline using collecting data from live network nodes 120 and wireless communications devices 110 and using data creation using different simulation scenarios. The algorithm adapts to cell specific conditions using online training at a network node with base station functionality (also referred to as a base-station) after the algorithm is deployed.

Training the algorithm involves updating all state transition counters, for each state, beam transition, and UE. A beam switch decision also depends on other factors, and in some embodiments, more information could be added to the state. For example, state transitions could be counted differently at different power levels or time of flight (Time alignment) between UE and gNB. For example, if the "best" next beams have poor measured power, it may make sense to select an uncommon beam if it has significantly higher power. A 3D Map together with radio node position, direction and tilt can be used to identify key static structures which can be cause of reflection of deployment site of the base station. This dataset can be used in training algorithm to distinguish between static and dynamic reflected beams.

As mentioned above, the learning itself could be improved for example by including some forgetting factor into the equations, counting beam which are measured but not selected or computing transition probabilities using for example Laplace additive smoothing. Forgetting older data helps the algorithm adopt to a changing scenario. In the fields of reinforcement learning and one-armed bandits, there are several algorithms and methods that could be considered.

When the algorithm is initially deployed, it is configured to be more exploratory when finding the best beam candidates for a wireless communications device 110 to transition to. Later, as the algorithm adapts to the cell specific conditions, and stabilizes, a better candidate beam selection performance can be achieved if the algorithm is more exploiting.

The beam state transition probability module 624 may determine the beam state transition probability in a variety of different ways however, one of which is described now in more detail. For example, consider a number n of wireless communications devices 110, connected to a network node 120, where each of the n wireless communications devices 110 is denoted $UE^n$. Each $UE^n$ transmits data over a beam $b^n$. If $b^n_+$ is the beat beam measured by the $UE^n$, and if $C[\{b, b+\}]$ denotes the number of time that $b_+$ is the measured best next beam from beam b. For each $UE^n$, current beam $b^n$, and measured best next beam $b^n_+$, the value stored in a counter C corresponding to the sequence $\{b^n, b^n_+\}$ is incremented by one:

$$[C[\{b^n, b^n_+\}] < -C[\{b^n, b^n_+\}] + 1$$

so that over time, C provides a sampled distribution of all the next best beams $b^n_+$ for all beams b.

Using this, it is possible to determine the probability $\widehat{p+}$ which approximates how likely it is that $b_+$ is the next best beam given past measurements as follows;

$$\widehat{p+} = \frac{C[\{b, b+\}]}{c(b)}$$

where for each beam b, the next best beam is marginalised away using $c(b) = \Sigma_i C[\{b, b_i\}]$ c(b) thus provides the number of times wireless communications devices 110A,B,C have been connected to beam b whilst performing a beam measurement. In some embodiments, if there are any zeros in C, these can smoothed using a suitable smoothing technique such as Laplace smoothing as would be apparent to anyone of ordinary skill in the art.

If the probability $\widehat{p+}$ is small, it indicates that the measured beam has not been a strong candidate for the given current beam in the past, which may indicate the beam is transient. By comparing the probability to a beam stability threshold probability value in some embodiments, a decision can be made about whether a beam or beam reflection is sufficiently stable or not to be considered available as a candidate beam for a wireless communications device 110 to transition to it. Whether a candidate beam is available is determined based on its degree of transience relative to the mobility of the wireless communications device 110 and the path the wireless communications device 110 is predicted to take. The beam stability threshold probability condition needs to take into account that in most cases the best available beam will be the current beam used by a wireless communications device 110 if the measurement frequency is sufficiently high, whereas at lower levels of measurement frequency, the threshold may need to be adjusted as this is less likely to be the case.

By way of an example embodiment only, a python based pseudo-code implementation may comprise:

```
# "switches" is a dictionary of dictionaries, like this
# switches = {
# beam2: {
# beam3: 5,
# beam4: 20,
# }
# beam5: {
# beam3: 10,
# beam9: 2,
# }
# }
# so that "switches[beam2][beam4] == 20", i.e. there are 20 transitions
from beam2 to beam4
switches = { }
def beamswitches(source_beam, dest_beam):
# update the "database" with current switch
switches[source_beam][dest_beam] += 1
def get_distribution(source_beam):
# compute total number of outgoing transitions from source_beam
total = sum(switches[source_beam])
# return a dictionary {dest_beam: probability} for all dest_beams
# starting at source_beam
return {key: val/total for key, val in
switches[source_beam].items( )}
# For example:
# get_distribution(beam2) = {
# beam3: 0.2,
# beam4: 0.8,
# }
```

This uses a database "switches" which holds counts of all beam switches, and two functions. One function updates the database with each new beam switch, and one function retrieves a probability distribution of outgoing beams for a particular input beam. This could be expanded to sequences of beam transitions in any suitable way known to those of ordinary skill in the art. The beam switch decisions can then based on by comparing the generated probabilities to some threshold and by taking the total number of switches into account, in order to have some confidence in the numbers.

By enabling more efficient utilisation of available beam candidates including beam reflections which are static or semi-static, the disclosed embodiments are able to reduce power consumption by wireless communications devices 110 since the network node 120 can configure a wireless communications device 110 to perform beam measurements on temporally reflected dynamic beams and may also enable faster utilization of temporally direct dynamic beams from a mobile network node 120 such as a mobile gNB.

Advantageous, the network node 120 categorizes static reflections based on the wireless communications device 110 movement path so that in some embodiments, static reflection candidate beam are selected.

In some embodiments, the network node 120 proposes a next set of candidate beams for the wireless communications device 110 to measure while disregarding the current beam it has latched on to. This could avoid frequent wide beam changes to save both power and resource on both the network node 120 and wireless communications device 110 and so improve good end user experience.

In some embodiments, the method 200 which was describe above in the context of FIG. 2A is performed by a wireless communications device 110 such as that shown schematically in FIG. 7 of the accompanying drawings. In some embodiments, the wireless communications device 110 sends beam data to a network node (120) in the form of beam measurement data or, alternatively, pilot signals for any detected beams can accordingly be provided. The network node 120 uses this beam measurement data along with the beam grid history of monitored beam measurement data to perform any of the disclosed methods 300, 400 to determine a suitable candidate beam for the wireless communications device 110 to transfer to. The suitable candidate beams may include a temporally semi-static or static beam reflections. Unsuitable temporally dynamic beam reflections can be filtered out from the available candidate set. in this way, the utilisation of available network resources for beam communications with the network nodes 120 in NR RANs 100, for example, with gNBs in 5G RANs, can be improved.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that where reference has been made to features such as NR RAN 100 and network nodes 120, which may use terminology from 3GPP LTE, 5G and 6G standards related technology to explain the example embodiments, this should not be seen as limiting the scope of the example embodiments to only these aforementioned communication systems. Other wireless systems may also benefit from the example embodiments disclosed herein.

Also note that terminology such as eNodeB and wireless communications device should be considered as non-limiting and does in particular not imply a certain hierarchical relation between the two. In general "eNodeB" could be considered as device 1 and "wireless communications device" as device 2, and these two devices communicate with each other over some radio channel. Furthermore, while the example embodiments focus on wireless transmissions in the uplink, it should be appreciated that the example embodiments could be applicable in the downlink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

A "wireless communications device" as the term may be used herein, is to be broadly interpreted to include a radio-telephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radio-telephone or wireless communication system; a laptop; a camera (e.g., video and/or still image camera) having communication ability; and any other computation or communication device capable of transcribing, such as a personal computer, a home entertainment system, a television, etc. Furthermore, a device may be interpreted as any number of antennas or antenna elements. The term "wireless communications device, should also be considered to refer to user equipment which is to be considered a non-limiting term which means any suitable wireless communications device a user may operate, a terminal, or a node capable of receiving in downlink and transmitting in uplink (e.g. PDA, laptop, mobile, sensor, fixed relay, mobile relay or even a radio base station, e.g. femto base station), which may or may not be always used or useable by a human user, for example user equipment may be used by a machine user in some embodiments.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments. A computer-readable medium may include any suitable form of memory 310 including removable and non-removable storage devices including, but not limited to, Read Only Memory (ROM), Random Access Memory (RAM), compact discs (CDs), digital versatile discs (DVD), flash memory, semi-persistent memory, etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A computer-implemented method, performed by a network node, for determining a candidate beam for a beam transition by a wireless communications device in a beam grid, the method comprising:
   monitoring beam tracking data from a plurality of wireless communications devices at a plurality of locations in the beam grid over a period of time;
   generating a beam grid history comprising monitored beam tracking data;
   determining, based on at least the beam grid history and current beam measurement data received from a wireless communications device at a location in the beam grid, at least one candidate beam for a beam transition by the wireless communications device; wherein determining the at least one candidate beam comprises determining the availability of a set of one or more available candidate beams, and wherein the availability is based on a frequency of appearance of the candidate beam in a beam grid history at the location of the wireless communications device; and
   selecting a candidate beam from the set of one or more available candidate beams based on one or more selection criteria met by the selected candidate beam.

2. The method of claim 1, wherein the method further comprises:
   sending an indication of the selected candidate beam to the wireless communications device.

3. The method of claim 1, further comprising classifying, based on the beam grid history at the location in the beam grid where the candidate beam is received by the wireless communications device, the candidate beam as a static candidate beam or a temporary candidate beam.

4. The method of claim 3, wherein a static candidate beam includes a temporally static reflection of a beam from a static reflector.

5. The method of claim 3, wherein a temporary candidate beam is a temporally semi-static beam reflection of a beam from a semi-static reflector.

6. The method of claim 3, wherein a temporary candidate beam is a temporally dynamic beam from one of:
   a mobile network node; and
   a moving reflective surface.

7. The method of claim 1, wherein the determined availability of a candidate beam for a beam transition is based on a beam transition probability distribution along at least one predicted path in the beam grid from the location of the wireless communications device.

8. The method of claim 7, wherein the method further comprises determining the beam transition probability distribution by determining a plurality of sequences of beam transitions by a plurality of wireless communications devices at a plurality of locations in the beam grid history.

9. The method of claim 1, wherein monitoring the beam tracking data comprises monitoring a pilot signal from a wireless communications device wherein the stored beam tracking data for the plurality of beams comprises stored beam measurement data determined by the network node based on the pilot signals received from a plurality of wireless communications devices.

10. The method of claim 1, wherein the monitored beam tracking data comprises beam measurement data measured by the wireless communications device and sent to the network node.

11. The method of a claim 1, wherein determining the availability of a candidate beam indicates the candidate beam is unavailable for a beam transition by the wireless communications device at the location in the beam grid, and the method further comprises:
   monitoring the beam grid history over a period of time; and
   based on the monitored beam grid history data including the unavailable candidate beam at the location over a period of time and based on subsequent beam measurement data for the candidate beam at the location taken by another wireless communications device, determining the candidate beam at that location is available for a beam transition by the other wireless communications device.

12. The method of claim 8, wherein a machine learning model is trained to determine a beam transition probability distribution based on beam measurements in the beam grid history.

13. The method of claim 12, wherein the beam tracking data in the beam grid history is used by the machine learning model to identify patterns of available candidate beams comprising temporally static or semi-static beam reflections in the beam grid.

14. The method of claim 12, wherein the beam tracking data in the beam grid history is used by the machine learning model to identify patterns of unavailable candidate beams comprising temporally dynamic beam reflections in the beam grid.

15. The method of claim 12, wherein the machine learning model is configured to remove from the determined beam transition probability distributions, one or more probability distributions for a transition to an unavailable beam.

16. The method of claim 12, wherein the machine learning model models each beam in the beam grid as a state of the beam grid and models each transition by a wireless communications device at a location in the beam grid as a state transition at that location, wherein each state holds a counter of all exit transitions from that state and the frequencies of occurrence.

17. The method of claim 16, wherein the method further comprises, for each wireless communications device performing an exit transition from a state to a next state at a location in the beam grid, recording the state transition by:

updating the counter of exit transitions from the state in the beam grid history; and updating a counter for the next state of the wireless communications device transitioning from the state in the beam grid history.

18. The method of claim 12, wherein each state in the beam grid history is represented by a count or sequence of previous beam transitions.

19. The method of claim 18, wherein the machine learning model identifies or classifies a candidate beam as an available or unavailable beam based on a history of state transitions to the candidate beam at the location of the wireless communications device in the beam grid.

20. The method of claim 19, wherein the machine learning model identifies or classifies a candidate beam as an available static or temporally semi-static reflection candidate beam by:

determining the probability distribution of the historic state transition from the current beam to the candidate beam; and based on the probability distribution of the candidate beam meeting a condition for classification of the candidate beam as a static or temporally semi-static reflection candidate beam, determining the static or temporally semi-static reflection candidate beam is available for a beam transition by the wireless communications device.

21. The method of claim 20, wherein the static or temporally semi-static reflection candidate beam is selected for the wireless communications device to transition to by the method further comprising:

predicting at least one path of the wireless communications device in the beam grid;

determining, based on the beam grid history, for the most probable predicted path, an initial static or temporally semi-static reflection candidate beam; and selecting the static or temporally semi-static reflected candidate beam based on beam measurement data at the location of the wireless communications device in the beam grid indicating the static or temporally semi-static reflected beam meets one or more selection criteria for the duration of the beam and the strength of the beam.

22. A network node in a wireless communication network configured to communicate with a user equipment (UE), the network node comprising:

interface circuitry for communicating with the UE;

processing circuitry operatively connected to the interface circuitry, the processing circuitry being configured to:

monitor beam tracking data from a plurality of wireless communications devices at a plurality of locations in the beam grid over a period of time;

generate a beam grid history comprising monitored beam tracking data;

determine, based on at least the beam grid history and current beam measurement data received from a wireless communications device at a location in the beam grid, at least one candidate beam for a beam transition by the wireless communications device; wherein determining the at least one candidate beam comprises determining the availability of a set of one or more available candidate beams, and wherein the availability is based on a frequency of appearance of the candidate beam in a beam grid history at the location of the wireless communications device; and select a candidate beam from the set of one or more available candidate beams based on one or more selection criteria met by the selected candidate beam.

\* \* \* \* \*